US005749734A

United States Patent [19]
Kohlberg

[11] Patent Number: 5,749,734
[45] Date of Patent: May 12, 1998

[54] MATHEMATICAL TEACHING APPARATUS

[76] Inventor: Elon Kohlberg, 122 Brattle St., Cambridge, Mass. 02138

[21] Appl. No.: 752,639

[22] Filed: Nov. 19, 1996

[51] Int. Cl.⁶ .................................................. G09B 23/02
[52] U.S. Cl. ........................ 434/195; 434/205; 434/208
[58] Field of Search ................................ 434/195, 196, 434/194, 205, 208, 204

[56] References Cited

U.S. PATENT DOCUMENTS

| D. 233,522 | 11/1974 | Majewski | 434/208 |
|---|---|---|---|
| 2,875,529 | 3/1959 | Cornelius | 434/208 |
| 3,229,388 | 1/1966 | Smith | 434/195 |
| 3,414,986 | 12/1968 | Stassen | 434/195 |
| 4,168,583 | 9/1979 | Halpern | 434/205 |
| 4,212,118 | 7/1980 | Baldwin et al. | 434/208 |
| 4,354,842 | 10/1982 | Stoddard et al. | 434/195 |
| 4,518,359 | 5/1985 | Yao-Psong | 434/195 |
| 4,585,419 | 4/1986 | Rinaldelli | 434/195 |
| 5,026,288 | 6/1991 | Castiglia et al. | 434/201 |
| 5,055,053 | 10/1991 | Hyman | 434/201 |
| 5,120,226 | 6/1992 | Tsai | 434/195 |
| 5,219,291 | 6/1993 | Fong et al. | 434/201 |
| 5,238,407 | 8/1993 | Pollock | 434/195 |
| 5,346,399 | 9/1994 | Sakow | 434/201 |
| 5,520,641 | 5/1996 | Shedeur | 434/201 |

*Primary Examiner*—Paul J. Hirsch
*Attorney, Agent, or Firm*—Henry D. Pahl, Jr.; David D. Lowry

[57] ABSTRACT

A mathematical teaching apparatus comprising block elements having a front and back side, including indentations and protrusions to allow the blocks elements to stack. The block elements are inserted into a block element sleeve, which hold 10 stacked block elements. Block element sleeves are also stacked and inserted into a large sleeve, which holds 10 stacked block element sleeves. Block element sleeves also include indentations and protrusion to allow stacking. All three units are counted by counting devices which provide an indication of the number of units of each type present. The counting devices also signal when 10 block elements or 10 block element sleeves are inserted, signalling to a user that the blocks or sleeves should be inserted into a next-larger size sleeve. The mathematical teaching apparatus allows children to learn the concepts of number magnitude, addition and subtraction, including carrying and borrowing. A computer program implementing these ideas can also be used to present the mathematical concepts.

26 Claims, 3 Drawing Sheets

MATHEMATICAL TEACHING APPARATUS

BACKGROUND

Fundamental mathematical concepts are very difficult to grasp. Although most adults use numbers and mathematics daily in performing activities, the underlying concepts are difficult to learn. Children often require several years to master the premise of recognizing that numbers represent a numerical quantity for a group of real world objects. Further, these abstract numerical quantities can be added and subtracted, which correspond to the number of real objects represented by the numerical quantity.

The grouping of numbers into fields such as hundreds, tens and ones is an abstraction within itself. In the decimal representation, numerical quantities are grouped into sets of singles, tens and hundreds units (and continues into thousands, etc.), allowing any size numerical quantity to be represented with a number. The idea that ten ones is the same as one ten is fairly straightforward, but changes resulting from addition and multiplication can be troublesome. Children must understand that adding single units can affect the tens or even hundreds units of a number.

Subtraction requires an even greater abstraction for children to master. When performing subtraction on two numbers, if the second number has a unit place larger than the first number, the child must "borrow" from the next higher unit of the first number to obtain enough units to perform the subtraction. This concept of borrowing from a higher unit is difficult to grasp. Schools often teach the borrowing process by rote, without allowing the students to truly understand what is going on.

Accordingly, what is needed is a system or apparatus allowing children and others to visualize the process of quantifying a set of objects, and once quantified, to manipulate that quantity with various mathematical techniques such as addition and subtraction. The apparatus should also be visually stimulating and exciting to help maintain attention of the users.

SUMMARY

The present invention solves the above problems using a plurality of block elements which are stacked together to produce a numeric quantity. The front and back of each block element can include dimples in the forms of indentations and protrusions allowing the block elements to stack together and remain cohesive as a unit.

Once stacked, the block elements are inserted into a block element sleeve which will organize and hold a predetermined number of stacked block elements. The block element sleeve can include protrusions and indentations which align and couple with the indentations and protrusions on the stack of block elements.

Further, at least one large sleeve can hold several block element sleeves for organizing and holding a predetermined number of stacked block element sleeves. Again, this large sleeve can include protrusions and indentations for aligning and coupling with the stack of stacked block element sleeves.

In the preferred embodiment, a block element sleeve will hold ten stacked block elements..and a large sleeve will hold ten stacked block element sleeves. Therefore, this system represents the decimal (Base 10) counting system. Other counting systems such as Base 8 or 12 are possible, and only require different size sleeves.

In one embodiment, the block element sleeves are collapsible by folding at the corners to allow easy storage. When released, the blocked element sleeve springs into a generally rectangular shape, allowing the easy insertion of stacked block elements. The large sleeve is also collapsible in the same manner.

The present invention also includes counting devices for providing a visual display of the number of block elements. Any of the block elements or sleeves can be inserted into the counting devices. In one embodiment, the counting devices has space for nine such elements (for example, block elements). When a tenth block is inserted, the counting device will produce a signal to the user that there are ten such elements. Therefore, the elements should be removed, stacked together inserted into a sleeve, and moved up to the next magnitude unit. For example, if ten block elements are collected during an addition, the singles counting device will signal the user to remove the block elements, insert them into a block element sleeve, and insert the block element sleeve into the ten's counting device. This reinforces the concept of carrying "overflow" to the next magnitude counter.

The counting devices can use several different means for determining the number of elements present. This can include an electronic sensing device, a weighing device, or a balancing device. For a balancing device, block elements or block element sleeves can be inserted into a open top box which is placed on a balancing platform. When a tenth block is inserted into the top of the box, the box will tip over, thereby signifying that units must be moved up the next magnitude counting unit.

The present invention can be implemented using physical block elements and sleeves. Alternatively, the block elements can be simulated on a computer display system using images of objects which are manipulated using a pointing device or keyboard.

DETAILED DESCRIPTION

Figure 1:
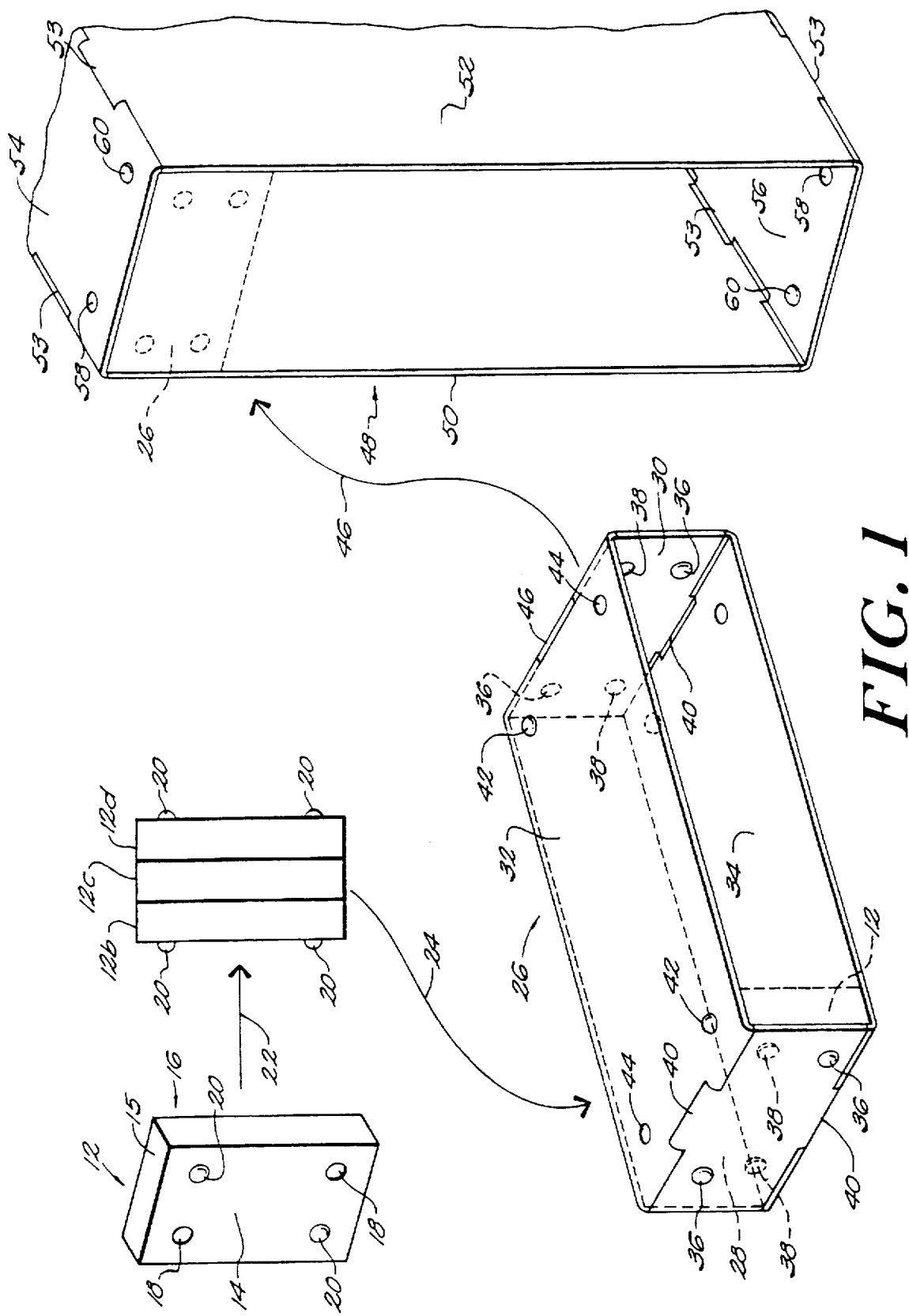
FIG. 1 is a pictorial view of block elements and block element sleeves according to the present invention.

The mathematical teaching apparatus 10, FIG. 1, of the present invention includes a block element 12 representing a single counting unit. Block element 12 is generally rectangular in shape with front 14 and back 16. Block element 12 can be constructed of any material. Block elements can also include dimples in the form of indentations 18 and protrusions 20 located on front surface 14 and back surface 16. These dimples and protrusions allow block elements 12 to be stacked together and maintain their position as shown by arrow 22. Block elements 12b, 12c and 12d are stacked and maintained together by dimples 18 aligning and connecting with protrusions 20.

Once a stack of block elements 12 are arranged, the block elements 12 are inserted into a block element container or sleeve 26, as generally shown by arrow 24. Block element sleeve 26 contains four sides, front 28, back 30, top 32 and bottom 34. These four sides are connected by hinges 40. Hinges 40 can be solid or flexible. Flexible hinges 40 allow the block element sleeve 26 to be collapsed for easy storage. Preferably, hinges 40 will be constructed to allow the block element sleeve 26 to normally maintain and unfolded (open) position, but require little force to collapse sleeve 26 for storage. When a predetermined number of stacked block elements 20 are inserted into block element sleeve 26, the indentations (dimples) 18 and protrusions 20 on block elements 12 will align and connect with dimples 36 and protrusions 38 on the front 28 and back 30 of block element sleeve 26. This will "lock" the stack of block elements 12 within block element sleeve 26, allowing easy manipulation as a unit. The proper number of block elements 12 must be inserted into block element sleeve 26. If fewer than the predetermined number are inserted, they will not lock into place.

Block element sleeve 26 also includes dimples 44 and protrusions 42 on the top surface 30 and bottom surface 34. These dimples and protrusions are on the outside of top and bottom surface 32 and 34.

Once several block element sleeves 26 are filled with block elements 12, block element sleeves 26 can be inserted into a container for block element containers (larger sleeve) 48, as generally shown by arrow 46. Larger sleeve 48 is similar to a block element sleeve 26 in that it has four sides, a front 54, a back 56, top 52 and bottom 50. These four sides are connected by hinges 53. Similar to the block element sleeve 26, the larger sleeve is collapsible along hinges 53 to allow easy stacking and storage of empty large sleeves 50.

Larger sleeve 50 include dimples 58 and protrusions 60 on the front surface 54 and rear surface 56. These dimples and protrusions align and connect with the protrusions 42 and dimple 44 on block element sleeve 26. This allows a stacked block element sleeves 26 to be inserted into larger sleeve 50 and "locked" into place allowing easy manipulation of a larger sleeve 48.

In the preferred embodiment, block element sleeve 26 will hold 10 block elements 12, and a larger sleeve 48 will hold 10 block element sleeves 26. This allows the teaching apparatus 10 to be used to demonstrate decimal notation based on tens and hundreds units. Alternate counting systems such as base 7, 8, 12 or 16 can also be used and are within the scope of the present invention. Indeed, a different set of block element sleeves 26 and larger sleeves 48 holding different numbers of block elements 12 can all be supplied as part of the mathematical teaching apparatus 10.

When used as a decimal (base 10) counting system, the block elements 12 represent single units or ones; block element sleeve 26 represents tens units; and larger sleeve 48 represent hundreds unit. An even larger sleeve (not shown) can be employed for grouping block elements into thousands, etc.

The proportions of block elements 12, block element sleeves 26 and larger sleeves 48 are all proportioned to each other using the dimension ratio of $1 \times R \times R^2$, where R is the third root of 10; which approximately is $1 \times 2.15 \times 4.64$. The dimension ratio for a ten block unit (block element sleeve 26) is $R \times R^2 \times R^3$ (approximately $2.15 \times 4.64 \times 10$). The dimension ratio for a 100 block unit (larger sleeve 48) is $R^2 \times R^3 \times R^4$, which is approximately $4.64 \times 10 \times 21.5$. Should a thousand block unit (not shown) be desired, the dimension ratio would be $R^3 \times R^4 \times R^5$, etc.

As long as the ratio proportion is maintained, the block elements 12 and sleeves 26, 48 can be manufactured in any size. For use by young children, a block element size of $1 \times 2.15 \times 4.65$ centimeters (length×width×height) allows easy manipulation by young hands. The sleeves 26, 48 are proportionally sized.

If a different base unit is used, then R would be the third root of the base system. For example, if a base twelve counting system is used, then R would be the third root of twelve, approximately 2.29.

Figure 3:
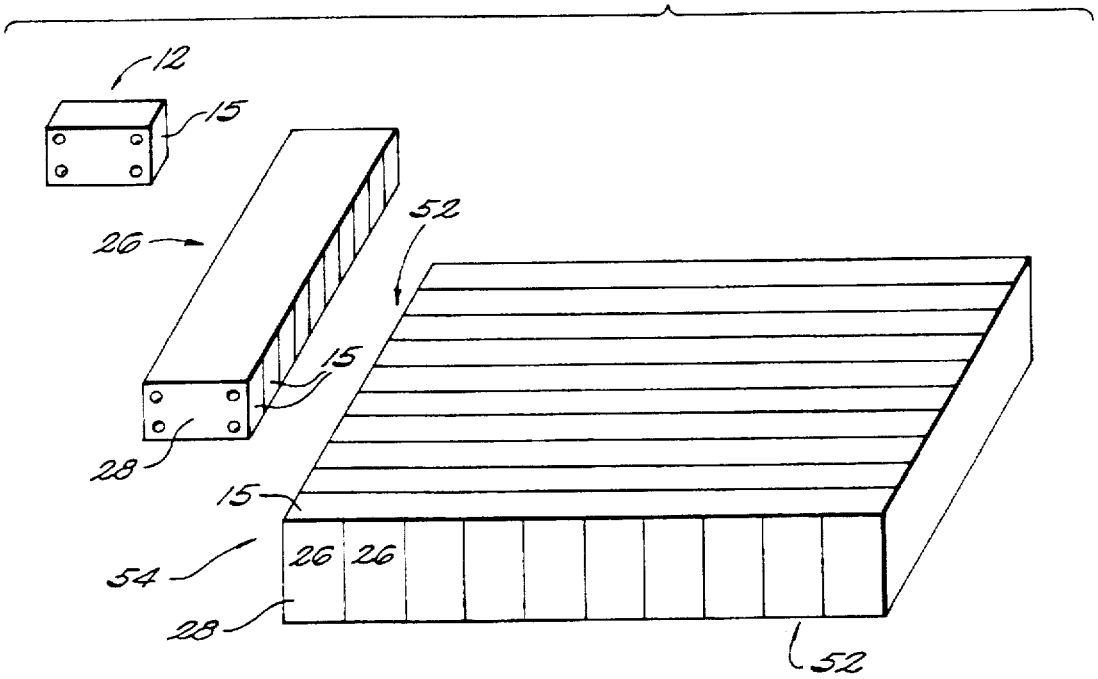
FIG. 3 is a pictorial view of how stacked block elements and block element sleeves provide a visual cues for organization and counting.

This dimension ratio allows for the block elements 12 and sleeves 26, 48 to each stack together neatly inside the next larger size. As seen in FIG. 3, ten block elements 12 will stack inside a block element sleeve 26, with their top side 15 exposed. A user can see the stack of ten block elements 12 stored inside the sleeve 26. When block element sleeves 28 are stored in a larger sleeve 48, the same effect occurs. The end side 28 of block element sleeves 26 are visible, so the user can see that ten block element sleeves 26. However, in one embodiment, the sides 50, 52 of large sleeve 48 are produced of a transparent material, which allows the user to see the top sides 15 of block elements 12. The user can visually understand the organization that ten sleeves 26 holding ten block elements 12 totals one hundred block elements 12. Also, different sleeves can be produced. For example, sleeves with opaque sides can be used to hide the blocks inside, thereby preventing a novice user from seeing the multiple block elements inside. A more advanced user could use the sleeves with transparent sides, and appreciate the added information of the array of visible block elements inside.

Figure 2:
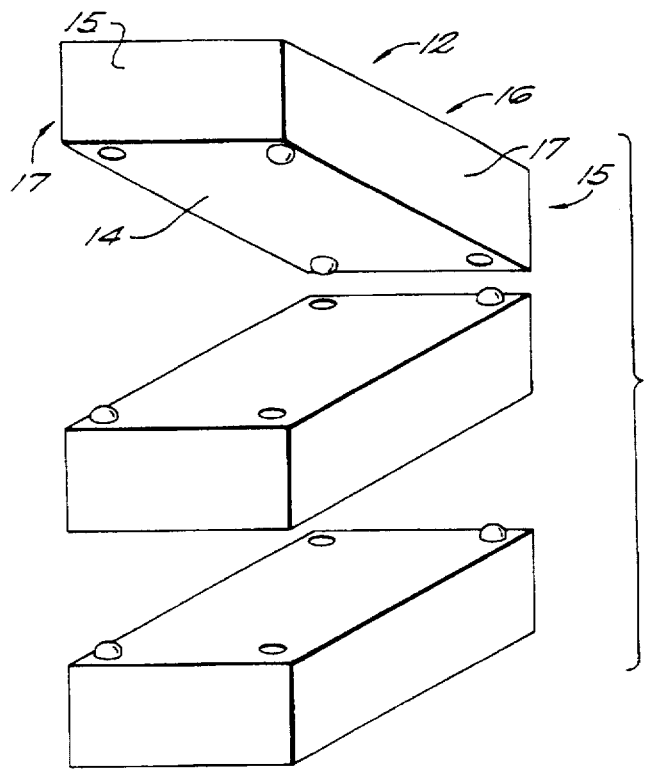
FIG. 2 is a pictorial view providing details of a block element, showing a physical appearance scheme according to the present invention.

Block elements 12, FIG. 2 include coloration of various sides to assist a person in visualizing and counting a set of stacked block elements. For example, all block element 12 can include a standard color on top and bottom sides 15 and a different standard color on left and right side 17. Therefore, when block elements 12 are stacked together, a common color is presented on front and back 15, and a different standard color represented on left and right side 17.

Accordingly, when a stack of ten block elements 12 are inserted into a block element sleeve 26, the color on the top and bottom 15 of block elements 12 will appear as a contiguous side of block element sleeve 26. This informs a user that ten block elements 12 have been inserted into block element sleeve 26. Thus the concept that a unit formed of block element sleeve 26 comprises ten sub-units, which are block elements 12 is reinforced.

The color scheme is continued by forming block element sleeve 26 with uniform color on front 28 and back 30 sides. Therefore, when block element sleeves 26 are inserted into larger sleeve 48, the uniform color on front 28 and back 30 surfaces of block element sleeve 26 are apparent to the user who can view the inserted block element sleeve 26 and larger sleeve 48. Continuing in this theme, top 54 and bottom 56 of larger sleeve 48 are of uniform color to indicate the hundreds unit.

In a preferred embodiment, block elements 12 are grey on front 14 and back 16, red on top and bottom 15, and blue on the left and right side. Block element sleeves 26 are green on end sides 28, 30 and grey on top and bottom sides 32 and 34. Larger sleeves 48 are yellow on front and back sides 54, 56, and grey on top and bottom sides 52 and 50. This color scheme therefore makes red represent single units (ones), green represent tens units, and yellow represent hundreds units. Each unit color displays correctly due to the ratio formula previously discussed. Other color schemes can be chosen for the various units.

Figure 5:
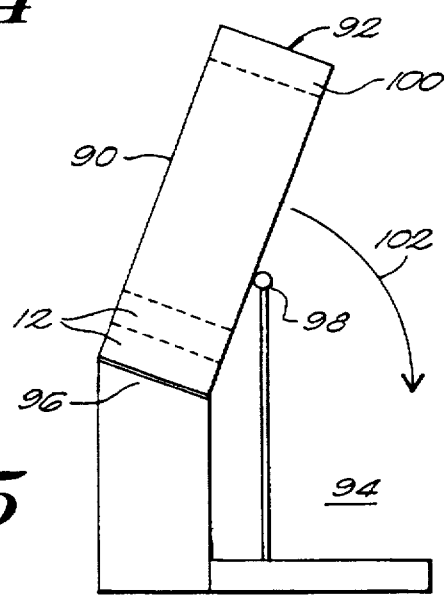
FIG. 5 is a pictorial view of another embodiment of a block element loading and counting device according to the present invention.

In another embodiment similar to the previous description, ten block elements 12 are placed inside a five sided container, with an open top (for example, see block element storage container 90, FIG. 5). A cover is then placed over the top, which now forms the container into a new "block element" for a tens unit. This sealing of ten block elements inside a container helps the user to understand that the single units must be collected and grouped in order to be counted.

In a variation on this embodiment of the present invention, the cover can not be placed on the container unless ten block elements 12 are placed inside the container. A mechanical lever device prevents the cover from installing on the container if less than ten block elements are inside. Once ten block elements are inserted into the container, then the top cover can be installed and will lock into place. This mechanical lever device can be built into the sides of the container, requiring a tenth block element (located near the top of the container) to displace the lever; or the mechanical lever device could be built into the top cover.

Figure 4:
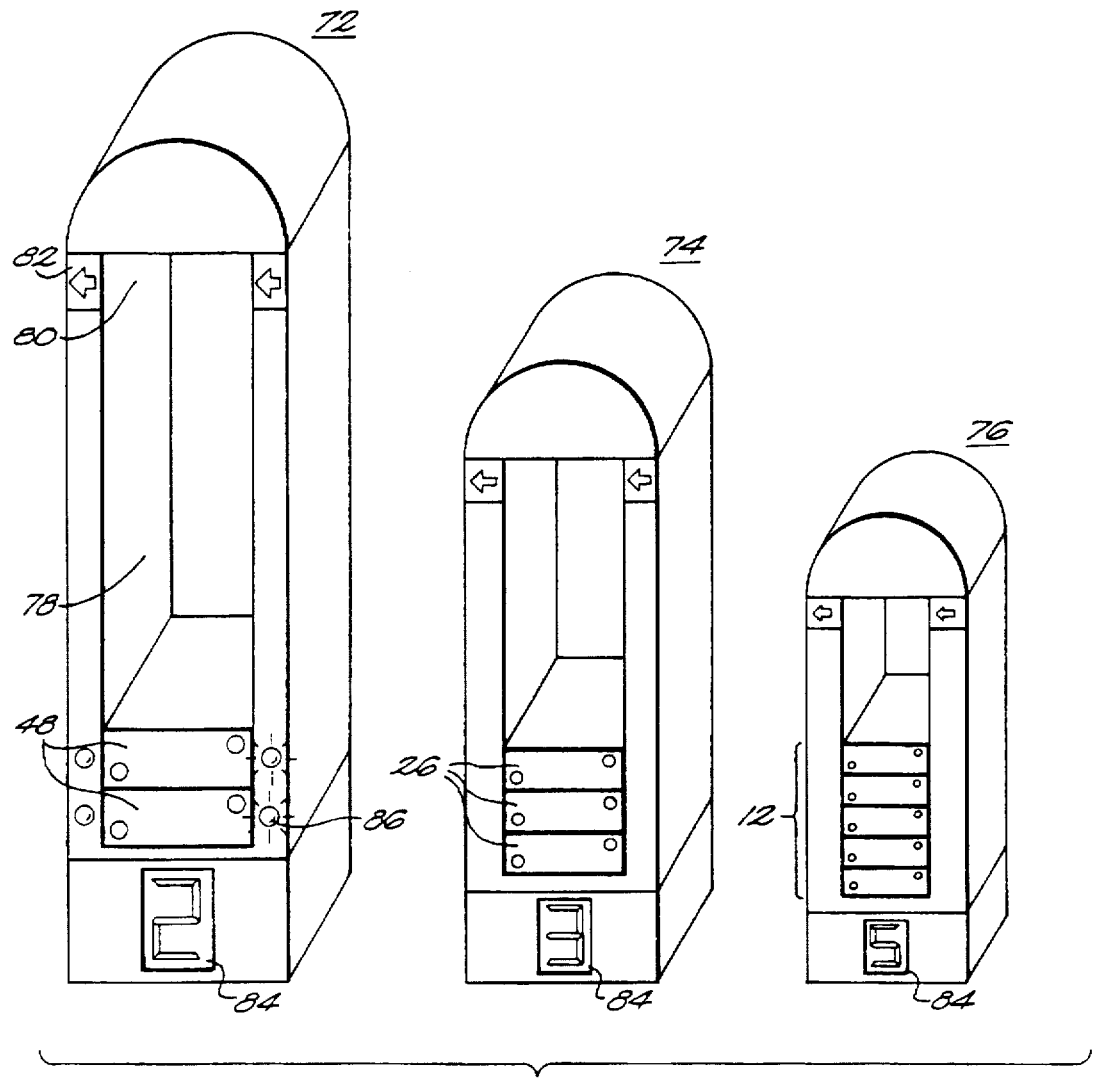
FIG. 4 is a pictorial view of one embodiment of loading and counting devices for counting block elements and block element sleeves.

Block elements 12, block element sleeves 26 and larger sleeves 48 can be automatically counted using a loading and counting device. For larger sleeves 48, a loading and counting device 72 FIG. 4 can show the number of larger sleeves 48 indicating a numerical quantity in the hundreds field. In one embodiment, larger sleeves 48 are inserted inside slot 78 of counting device 72. A visual display 84 indicates the number of inserted sleeves 48, which in this example is two. Other visual indicia such as lighting LED's 86 which indicate an inserted larger sleeve 48 can also be used.

Larger sleeve loading and counting device 72 contains enough internal space in slot 78 to allow the insertion of 9 larger sleeves 48. A special slot 80 is available for when a tenth sleeve 48 is inserted. Upon insertion of a sleeve 48 into area 80, lighting indicia 82 are activated, indicating to the user that all ten units should be removed from counting device 72 and moved into the next larger size device. This teaches the concept that a set of ten units needs to be moved into the next counting unit of magnitude. Different means of indicating that a tenth unit should be removed include a lighting indicia as shown by 82, or an ejection system which would eject all ten sleeves 48 (not shown).

Counting units are provided for each block units, including a loading and counting device 74 for block element sleeves 26, and a singular block element loading and counting device 76 for block elements 12. The counting devices 72, 74 and 76 can be separate units, or connected together into one device (not shown). The numeric display 84 can be determined by any sensing means inside counting devices 72, 74, 76, which includes a pressure sensitive switch for each element slot, electrical contact points, or a weighing device. Further, counting devices 72, 74, 76 can include a numerical input device, such as a keypad, allowing the user to enter a count for the number of elements inside the counting devices 72, 74, 76 whereupon the counting device will signal if the number entered was correct or not.

In an alternative embodiment, a block element storage device 90 FIG. 5 is used in conjunction with a count limiting device 94 to teach the concept of carrying over to the next magnitude unit size. Block element storage device 90 comprises a rectangular box-like device with five sides and an open top 92. As block elements 12 are inserted into storage device 90, block elements 12 will stack.

When storage device 90 is inserted on podium 96 of count limiting device 94, storage device 90 will lean against pivot point 98. As more block elements 12 are inserted into storage device 90, the center of gravity will rise. When a tenth block element 12 is inserted in the top of storage device 90 through opening 92 as generally shown by 100, the center of gravity of storage device 90 will cause element storage device 90 to pivot over pivot point 98 as generally shown by arrow 102. In effect, the element storage device tips over. The provides an indication to the user that the block elements 12 should be collected as a stack of ten, either by putting a cover on the block element storage device 90, as previously discussed, or by placing the block elements 12 within a block element sleeve 26. Count limiting device 94 can also be produced for counting block element sleeves 26 and larger sleeves 48.

In using the mathematical teaching apparatus, a child or other user can easily visualize the concepts of addition and subtraction. For example, given an arbitrary number of block elements, a user can then be instructed to group the elements into a numeric quantity. The user inserts block elements 12 into block elements sleeves 26 in groups of ten, thereby producing a set of filled block element sleeves 26 and a remaining number of block elements. The user can then report the number of block elements by using the number of block element sleeves 26 for the 10's column and the remaining number of block elements 12 for the singles column. In performing these steps, the user is learning the decimal counting process through learning by doing.

For addition, a user is given an arbitrary number of filled block element sleeves 26 and block elements 12, and then be given another number of the same. The user will learn that the block elements 12 must first be combined (stacked) to see if the number of block elements exceeds ten. If so, then the user must insert ten block elements 12 into a block element sleeve 26. Subsequently, the user might determine that the number of block element sleeves 26 is greater than 10 and requires the insertion of block element 26 into a larger sleeve 48.

In performing these steps, the user can approach the addition problem from either—end ie, by combining the larger units first ("left to right"), or the smaller units first ("right to left"). Although children are often taught to add the smaller units first (as taught by using numbers arranged columns), this is not the only solution. The present invention allows users to combine block elements and sleeves in any order. Therefore the user can discover different orders for combining block elements and sleeves, and decide if combining the smaller units first is "better".

In subtraction, the concept of carrying is readily learned in that if a user lacks the proper number of units (such as block elements 12) to subtract, they must "borrow". The user would take apart a larger unit, such as by removing ten block elements 12 from a block element sleeve 26 to obtain enough block elements 12 to perform the subtraction operation for the singles unit. Hence, the present invention reinforces the concept of borrowing from a larger unit to perform the subtraction operation.

Although the present invention has been described in terms of presenting the user with a system for visualizing the standard mathematical concepts for addition and subtraction, the present invention actually presents a much broader concept. By using the present invention, users learn two techniques:

1. How to put together and take apart collections of objects.
2. How to load the collections of objects into loading and counting devices.

In mastering these two techniques, the user has learned the fundamental concept underlying arithmetic. Objects are grouped into collections, and then the objects and collections are partitioned into a quantity measurement. By performing the two techniques, the user will discover the one solution to the problem, in this case the decimal counting system. Since collections must contain ten subobjects, and loading and counting devices will only hold nine objects or collections, no other solution is possible. The user will learn the proper grouping, and numerical quantifying, of a set of objects. Once this fundamental concept is understood, then addition and subtraction (and other mathematical concepts) are simply variations of this concept.

Accordingly, the present invention allows a child or other person to easily visualize and grasp the concepts of numerical representation of units, and the higher concepts of addition, subtraction and other operations using such numerical quantities for units. Although implemented using block elements and sleeves, the present invention can also be implemented using a visual display device. One example of a display device is a computer monitor. A computer system is programmed to implement block element images on a computer screen and allow manipulation using a visual pointing device, such as a mouse. The user would perform the same operations of moving block elements into a block element sleeve by selecting and moving or dragging units on the screen. The computer system would provide visual indications of the number of elements counted. Lessons consisting of steps to be performed provided by a child or other person can also be implemented on such a computer system.

Modifications of the present invention are possible in light of the above disclosure. It is therefore to be understood that the scope of the invention is limited only by the following claims.

What is claimed is:

1. A mathematical teaching apparatus comprising:
   a plurality of block elements;
   a block element container, for organizing and holding a plurality of block elements, wherein a plurality of block elements will lock and hold within said block element container only when a predetermined number of block elements are inserted into said block element container; and
   a container for block element containers, for organizing and holding a plurality of block element containers, wherein a plurality of block element containers will lock and hold within said container for block element containers only when a same said predetermined number of block element containers are inserted into said container for block element containers.

2. The mathematical teaching apparatus of claim 1 wherein each of said plurality of block elements includes indentations and protrusions for aligning said plurality of block elements when they are stacked together, wherein said protrusions on one block element align and engage with said indentations on a proceeding block element.

3. The mathematical teaching apparatus of claim 2 wherein said block element container includes indentations and protrusions for aligning a stack of block elements by aligning with a first block element of a stack of block elements, and aligning with a last block element of a stack of block elements.

4. The mathematical teaching apparatus of claim 1 wherein said block element container includes a front, back, top, and bottom sides forming a generally rectangular shape, and said front, back, top, and bottom sides are flexibly coupled together, allowing said block element container to fold flat.

5. The mathematical teaching apparatus of claim 1 wherein said container for block element containers includes a front, back, top, and bottom sides forming a generally rectangular shape, and said front, back, top, and bottom sides are flexibly coupled together, allowing said container for block element containers to fold flat.

6. The mathematical teaching apparatus of claim 1 wherein each of said plurality of block elements has a proportion ratio $1 \times R \times R^2$; said block element container has a proportion ratio of $R \times R^2 \times R^3$; and said container for block element containers has a proportion ratio of $R^2 \times R^3 \times R^4$; wherein R is the third root of the numerical value of said predetermined number of block elements.

7. The mathematical teaching apparatus of claim 1 wherein said block element container holds ten stacked block elements.

8. The mathematical teaching apparatus of claim 1 wherein said container for block element containers holds ten stacked block element containers.

9. The mathematical teaching apparatus of claim 1 further including:
   a block element counting device, responsive to the insertion of block elements, for signalling a numeric value indicating the number of block elements inserted into said block element counting device.

10. The mathematical teaching apparatus of claim 1 further including:
    a block element container counting device, responsive to the insertion of block element containers, for signalling a numeric value indicating the number of block element containers inserted into said block element container counting device.

11. The mathematical teaching apparatus of claim 1 further including:
    a container for block element containers counting device, responsive to the insertion of containers for block element containers, for signalling a numeric value indicating the number of containers for block element containers inserted into said container for block element container counting device.

12. The mathematical teaching apparatus of claim 9 wherein said block element counting device is responsive to the insertion of ten block elements, for causing said ten block elements to be ejected from said block element counting device.

13. The mathematical teaching apparatus of claim 10 wherein said block element container counting device is responsive to the insertion of ten block element containers, for causing said ten block element containers to be ejected from said block element container counting device.

14. The mathematical teaching apparatus of claim 1 further including:
    a block element storage device including a front, back left, right and bottom side, for containing a predetermined number of stacked block elements; and
    a block element count limiting device, including a base and pivot point, for supporting said block element storage device, and allowing said block element storage device to pivot around said pivot point.

15. The mathematical teaching device of claim 1 wherein said plurality of block elements, block element container, and said container for block element containers are implemented on a computer system and displayed and manipulated on a computer display device.

16. The mathematical teaching apparatus of claim 1 wherein each of said plurality of block elements, said block element container, and said container for block element containers each have a same length, width, and height ratio with respect to each other.

17. The mathematical teaching apparatus of claim 1 wherein:

said predetermined number of block elements will substantially fill said block element container; and said predetermined number of block element containers will substantially fill said container for block element containers.

18. A mathematical teaching apparatus comprising:

a plurality of block elements, each of said plurality of block elements having a front and back side;

at least one block element container including a front, back, left, right, and bottom sides, for organizing and holding a predetermined number of block elements; and a block element container cover, for sealing said block element container, wherein said block element container cover will close and seal said block element container only when said block element container holds said predetermined number of block elements.

19. A mathematical teaching apparatus comprising:

a plurality of block elements;

a block element container, for organizing and holding a plurality of block elements, wherein a plurality of block elements will lock and hold within said block element container only when a predetermined number of block elements are inserted into said block element container; and a container for block element containers, for organizing and holding a plurality of block element containers, wherein said plurality of block element containers will lock and hold within said at least one container for block element containers only when a same said predetermined number of block element containers are inserted into said container for block element containers.

20. A mathematical teaching apparatus comprising:

a block element;

a block element container, for organizing and holding a plurality of block elements, wherein said block element container has a same length, width and height ratio, and a similar appearance to said block element; and a container for block element containers, for organizing and holding a plurality of block element containers, wherein said container for block element containers has a same length, width and height ratio, and a similar appearance to said block element.

21. The mathematical teaching apparatus of claim 20 wherein said block element has a proportion ratio $1 \times R \times R^2$; said block element container has a proportion ratio of $R \times R^2 \times R^3$; and said container for block element containers has a proportion ratio of $R^2 \times R^3 \times R^4$; wherein R is the third root of a predetermined number.

22. The mathematical teaching apparatus of claim 21 wherein said predetermined number is 10.

23. The mathematical teaching apparatus of claim 21 wherein:

said predetermined number of block elements will substantially fill said block element container; and said predetermined number of block element containers will substantially fill said container for block element containers.

24. The mathematical teaching apparatus of claim 21 wherein:

when said predetermined number of block elements are inserted into said block element container, said predetermined number of block elements will lock and hold within said block element container; and when said predetermined number of block element containers are inserted into said container for block element containers, said predetermined number of block element containers will lock and hold within said container for block element containers.

25. A mathematical teaching apparatus comprising:

a plurality of block elements;

a block element container having a same length, width, and height ratio with respect to each of said plurality of block elements, said block element container for organizing and holding a plurality of block elements, wherein a plurality of block elements will substantially fill and lock and hold within said block element container only when a predetermined number of block elements are inserted into said block element container.

26. The mathematical teaching apparatus of claim 25 further including:

a container for block element containers having a same length, width, and height ratio with respect to said block element container, said container for block element containers for organizing and holding a plurality of block element containers, wherein a plurality of block element containers will substantially fill and lock and hold within said container for block element containers only when said same predetermined number of block element containers are inserted into said container for block element containers.

* * * * *